(12) United States Patent
Chernyshov et al.

(10) Patent No.: US 8,867,322 B1
(45) Date of Patent: Oct. 21, 2014

(54) SYSTEMS AND METHODS FOR PROVIDING THERMAL BARRIER BILAYERS FOR HEAT ASSISTED MAGNETIC RECORDING MEDIA

(71) Applicant: WD Media, LLC, San Jose, CA (US)

(72) Inventors: Alexander S. Chernyshov, San Jose, CA (US); Hua Yuan, Fremont, CA (US); Bincheng Wang, Sunnyvale, CA (US); Tomoko Seki, Sunnyvale, CA (US); Antony Ajan, Santa Clara, CA (US); B. Ramamurthy Acharya, Fremont, CA (US); Gerardo A. Bertero, Redwood City, CA (US); David Treves, Palo Alto, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/932,348

(22) Filed: Jul. 1, 2013

Related U.S. Application Data

(60) Provisional application No. 61/820,583, filed on May 7, 2013.

(51) Int. Cl.
*G11B 11/00* (2006.01)
*G11B 23/00* (2006.01)
*G11B 5/66* (2006.01)
*G11B 13/04* (2006.01)
*G11B 5/738* (2006.01)
*G11B 5/84* (2006.01)

(52) U.S. Cl.
CPC ............... *G11B 5/738* (2013.01); *G11B 13/04* (2013.01); *G11B 5/8404* (2013.01)

USPC .......... 369/13.32; 360/131; 428/831; 428/836

(58) Field of Classification Search
None
See application file for complete search history.

(56) References Cited

U.S. PATENT DOCUMENTS

| | | | |
|---|---|---|---|
| 6,013,161 | A | 1/2000 | Chen et al. |
| 6,063,248 | A | 5/2000 | Bourez et al. |
| 6,068,891 | A | 5/2000 | O'Dell et al. |
| 6,086,730 | A | 7/2000 | Liu et al. |
| 6,099,981 | A | 8/2000 | Nishimori |
| 6,103,404 | A | 8/2000 | Ross et al. |
| 6,117,499 | A | 9/2000 | Wong et al. |
| 6,136,403 | A | 10/2000 | Prabhakara et al. |
| 6,143,375 | A | 11/2000 | Ross et al. |
| 6,145,849 | A | 11/2000 | Bae et al. |
| 6,146,737 | A | 11/2000 | Malhotra et al. |

(Continued)

OTHER PUBLICATIONS

U.S. Appl. No. 13/019,095, filed Feb. 1, 2011, 22 pages.

(Continued)

*Primary Examiner* — Thang Tran (57) ABSTRACT

Systems and methods for providing thermal barrier bilayers for heat assisted magnetic recording (HAMR) media are provided. One such HAMR medium includes a substrate, a heat sink layer on the substrate, a thermal barrier bilayer on the heat sink layer, the bilayer comprising a first thermal barrier layer on the heat sink layer and an amorphous underlayer on the first thermal barrier layer, and a magnetic recording layer on the amorphous underlayer, wherein a thermal conductivity of the first thermal barrier layer is less than a thermal conductivity of the amorphous underlayer.

25 Claims, 5 Drawing Sheets

(56) References Cited

U.S. PATENT DOCUMENTS

| | | | |
|---|---|---|---|
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |
| 6,303,217 B1 | 10/2001 | Malhotra et al. | |
| 6,309,765 B1 | 10/2001 | Suekane et al. | |
| 6,358,636 B1 | 3/2002 | Yang et al. | |
| 6,362,452 B1 | 3/2002 | Suzuki et al. | |
| 6,363,599 B1 | 4/2002 | Bajorek | |
| 6,365,012 B1 | 4/2002 | Sato et al. | |
| 6,381,090 B1 | 4/2002 | Suzuki et al. | |
| 6,381,092 B1 | 4/2002 | Suzuki | |
| 6,387,483 B1 | 5/2002 | Hokkyo et al. | |
| 6,391,213 B1 | 5/2002 | Homola | |
| 6,395,349 B1 | 5/2002 | Salamon | |
| 6,403,919 B1 | 6/2002 | Salamon | |
| 6,408,677 B1 | 6/2002 | Suzuki | |
| 6,426,157 B1 | 7/2002 | Hokkyo et al. | |
| 6,429,984 B1 | 8/2002 | Alex | |
| 6,482,330 B1 | 11/2002 | Bajorek | |
| 6,482,505 B1 | 11/2002 | Bertero et al. | |
| 6,500,567 B1 | 12/2002 | Bertero et al. | |
| 6,528,124 B1 | 3/2003 | Nguyen | |
| 6,548,821 B1 | 4/2003 | Treves et al. | |
| 6,552,871 B2 | 4/2003 | Suzuki et al. | |
| 6,565,719 B1 | 5/2003 | Lairson et al. | |
| 6,566,674 B1 | 5/2003 | Treves et al. | |
| 6,571,806 B2 | 6/2003 | Rosano et al. | |
| 6,628,466 B2 | 9/2003 | Alex | |
| 6,664,503 B1 | 12/2003 | Hsieh et al. | |
| 6,670,055 B2 | 12/2003 | Tomiyasu et al. | |
| 6,682,807 B2 | 1/2004 | Lairson et al. | |
| 6,683,754 B2 | 1/2004 | Suzuki et al. | |
| 6,730,420 B1 | 5/2004 | Bertero et al. | |
| 6,743,528 B2 | 6/2004 | Suekane et al. | |
| 6,759,138 B2 | 7/2004 | Tomiyasu et al. | |
| 6,778,353 B1 | 8/2004 | Harper | |
| 6,795,274 B1 | 9/2004 | Hsieh et al. | |
| 6,855,232 B2 | 2/2005 | Jairson et al. | |
| 6,857,937 B2 | 2/2005 | Bajorek | |
| 6,893,748 B2 | 5/2005 | Bertero et al. | |
| 6,899,959 B2 | 5/2005 | Bertero et al. | |
| 6,916,558 B2 | 7/2005 | Umezawa et al. | |
| 6,939,120 B1 | 9/2005 | Harper | |
| 6,946,191 B2 | 9/2005 | Morikawa et al. | |
| 6,967,798 B2 | 11/2005 | Homola et al. | |
| 6,972,135 B2 | 12/2005 | Homola | |
| 7,004,827 B1 | 2/2006 | Suzuki et al. | |
| 7,006,323 B1 | 2/2006 | Suzuki | |
| 7,016,154 B2 | 3/2006 | Nishihira | |
| 7,019,924 B2 | 3/2006 | McNeil et al. | |
| 7,045,215 B2 | 5/2006 | Shimokawa | |
| 7,070,870 B2 | 7/2006 | Bertero et al. | |
| 7,090,934 B2 | 8/2006 | Hokkyo et al. | |
| 7,099,112 B1 | 8/2006 | Harper | |
| 7,105,241 B2 | 9/2006 | Shimokawa et al. | |
| 7,119,990 B2 | 10/2006 | Bajorek et al. | |
| 7,147,790 B2 | 12/2006 | Wachenschwanz et al. | |
| 7,161,753 B2 | 1/2007 | Wachenschwanz et al. | |
| 7,166,319 B2 | 1/2007 | Ishiyama | |
| 7,166,374 B2 | 1/2007 | Suekane et al. | |
| 7,169,487 B2 | 1/2007 | Kawai et al. | |
| 7,174,775 B2 | 2/2007 | Ishiyama | |
| 7,179,549 B2 | 2/2007 | Malhotra et al. | |
| 7,184,139 B2 | 2/2007 | Treves et al. | |
| 7,196,860 B2 | 3/2007 | Alex | |
| 7,199,977 B2 | 4/2007 | Suzuki et al. | |
| 7,208,236 B2 | 4/2007 | Morikawa et al. | |
| 7,220,500 B1 | 5/2007 | Tomiyasu et al. | |
| 7,229,266 B2 | 6/2007 | Harper | |
| 7,239,970 B2 | 7/2007 | Treves et al. | |
| 7,252,897 B2 | 8/2007 | Shimokawa et al. | |
| 7,277,254 B2 | 10/2007 | Shimokawa et al. | |
| 7,281,920 B2 | 10/2007 | Homola et al. | |
| 7,292,329 B2 | 11/2007 | Treves et al. | |
| 7,301,726 B1 | 11/2007 | Suzuki | |
| 7,302,148 B2 | 11/2007 | Treves et al. | |
| 7,305,119 B2 | 12/2007 | Treves et al. | |
| 7,314,404 B2 | 1/2008 | Singh et al. | |
| 7,320,584 B1 | 1/2008 | Harper et al. | |
| 7,329,114 B2 | 2/2008 | Harper et al. | |
| 7,375,362 B2 | 5/2008 | Treves et al. | |
| 7,420,886 B2 | 9/2008 | Tomiyasu et al. | |
| 7,425,719 B2 | 9/2008 | Treves et al. | |
| 7,471,484 B2 | 12/2008 | Wachenschwanz et al. | |
| 7,498,062 B2 | 3/2009 | Calcaterra et al. | |
| 7,531,485 B2 | 5/2009 | Hara et al. | |
| 7,537,846 B2 | 5/2009 | Ishiyama et al. | |
| 7,549,209 B2 | 6/2009 | Wachenschwanz et al. | |
| 7,569,162 B2 | 8/2009 | Nomiya et al. | |
| 7,569,490 B2 | 8/2009 | Staud | |
| 7,597,792 B2 | 10/2009 | Homola et al. | |
| 7,597,973 B2 | 10/2009 | Ishiyama | |
| 7,608,193 B2 | 10/2009 | Wachenschwanz et al. | |
| 7,632,087 B2 | 12/2009 | Homola | |
| 7,656,615 B2 | 2/2010 | Wachenschwanz et al. | |
| 7,682,546 B2 | 3/2010 | Harper | |
| 7,684,152 B2 | 3/2010 | Suzuki et al. | |
| 7,686,606 B2 | 3/2010 | Harper et al. | |
| 7,686,991 B2 | 3/2010 | Harper | |
| 7,695,833 B2 | 4/2010 | Ishiyama | |
| 7,722,968 B2 | 5/2010 | Ishiyama | |
| 7,733,605 B2 | 6/2010 | Suzuki et al. | |
| 7,736,768 B2 | 6/2010 | Ishiyama | |
| 7,755,861 B1 | 7/2010 | Li et al. | |
| 7,758,732 B1 | 7/2010 | Calcaterra et al. | |
| 7,833,639 B2 | 11/2010 | Sonobe et al. | |
| 7,833,641 B2 | 11/2010 | Tomiyasu et al. | |
| 7,869,162 B2 * | 1/2011 | Lu et al. | 360/125.31 |
| 7,910,159 B2 | 3/2011 | Jung | |
| 7,911,736 B2 | 3/2011 | Bajorek | |
| 7,924,519 B2 | 4/2011 | Lambert | |
| 7,944,165 B1 | 5/2011 | O'Dell | |
| 7,944,643 B1 | 5/2011 | Jiang et al. | |
| 7,955,723 B2 | 6/2011 | Umezawa et al. | |
| 7,983,003 B2 | 7/2011 | Sonobe et al. | |
| 7,993,497 B2 | 8/2011 | Moroishi et al. | |
| 7,993,765 B2 | 8/2011 | Kim et al. | |
| 7,998,912 B2 | 8/2011 | Chen et al. | |
| 8,002,901 B1 | 8/2011 | Chen et al. | |
| 8,003,237 B2 | 8/2011 | Sonobe et al. | |
| 8,012,920 B2 | 9/2011 | Shimokawa | |
| 8,038,863 B2 | 10/2011 | Homola | |
| 8,057,926 B2 | 11/2011 | Ayama et al. | |
| 8,062,778 B2 | 11/2011 | Suzuki et al. | |
| 8,064,156 B1 | 11/2011 | Suzuki et al. | |
| 8,076,013 B2 | 12/2011 | Sonobe et al. | |
| 8,092,931 B2 | 1/2012 | Ishiyama et al. | |
| 8,100,685 B1 | 1/2012 | Harper et al. | |
| 8,101,054 B2 | 1/2012 | Chen et al. | |
| 8,125,723 B1 | 2/2012 | Nichols et al. | |
| 8,125,724 B1 | 2/2012 | Nichols et al. | |
| 8,137,517 B1 | 3/2012 | Bourez | |
| 8,142,916 B2 | 3/2012 | Umezawa et al. | |
| 8,149,539 B2 | 4/2012 | Lu et al. | |
| 8,163,093 B1 | 4/2012 | Chen et al. | |
| 8,171,949 B1 | 5/2012 | Lund et al. | |
| 8,173,282 B1 | 5/2012 | Sun et al. | |
| 8,178,480 B2 | 5/2012 | Hamakubo et al. | |

(56) References Cited

U.S. PATENT DOCUMENTS

| | | | |
|---|---|---|---|
| 8,206,789 B2 | 6/2012 | Suzuki | |
| 8,218,260 B2 | 7/2012 | Iamratanakul et al. | |
| 8,247,095 B2 | 8/2012 | Champion et al. | |
| 8,257,783 B2 | 9/2012 | Suzuki et al. | |
| 8,298,609 B1 | 10/2012 | Liew et al. | |
| 8,298,689 B2 | 10/2012 | Sonobe et al. | |
| 8,309,239 B2 | 11/2012 | Umezawa et al. | |
| 8,316,668 B1 | 11/2012 | Chan et al. | |
| 8,331,056 B2 | 12/2012 | O'Dell | |
| 8,354,618 B1 | 1/2013 | Chen et al. | |
| 8,367,228 B2 | 2/2013 | Sonobe et al. | |
| 8,383,209 B2 | 2/2013 | Ayama | |
| 8,394,243 B1 | 3/2013 | Jung et al. | |
| 8,397,751 B1 | 3/2013 | Chan et al. | |
| 8,399,809 B1 | 3/2013 | Bourez | |
| 8,402,638 B1 | 3/2013 | Treves et al. | |
| 8,404,056 B1 | 3/2013 | Chen et al. | |
| 8,404,369 B2 | 3/2013 | Ruffini et al. | |
| 8,404,370 B2 | 3/2013 | Sato et al. | |
| 8,406,918 B2 | 3/2013 | Tan et al. | |
| 8,414,966 B2 | 4/2013 | Yasumori et al. | |
| 8,425,975 B2 | 4/2013 | Ishiyama | |
| 8,431,257 B2 | 4/2013 | Kim et al. | |
| 8,431,258 B2 | 4/2013 | Onoue et al. | |
| 8,453,315 B2 | 6/2013 | Kajiwara et al. | |
| 8,488,276 B1 | 7/2013 | Jung et al. | |
| 8,491,800 B1 | 7/2013 | Dorsey | |
| 8,492,009 B1 | 7/2013 | Homola et al. | |
| 8,492,011 B2 | 7/2013 | Itoh et al. | |
| 8,496,466 B1 | 7/2013 | Treves et al. | |
| 8,517,364 B1 | 8/2013 | Crumley et al. | |
| 8,517,657 B2 | 8/2013 | Chen et al. | |
| 8,524,052 B1 | 9/2013 | Tan et al. | |
| 8,530,065 B1 | 9/2013 | Chernyshov et al. | |
| 8,546,000 B2 | 10/2013 | Umezawa | |
| 8,551,253 B2 | 10/2013 | Na'im et al. | |
| 8,551,627 B2 | 10/2013 | Shimada et al. | |
| 8,556,566 B1 | 10/2013 | Suzuki et al. | |
| 8,559,131 B2 | 10/2013 | Masuda et al. | |
| 8,562,748 B1 | 10/2013 | Chen et al. | |
| 8,565,050 B1 | 10/2013 | Bertero et al. | |
| 8,570,844 B1 | 10/2013 | Yuan et al. | |
| 8,576,672 B1 * | 11/2013 | Peng et al. | 369/13.24 |
| 8,580,410 B2 | 11/2013 | Onoue | |
| 8,584,687 B1 | 11/2013 | Chen et al. | |
| 8,591,709 B1 | 11/2013 | Lim et al. | |
| 8,592,061 B2 | 11/2013 | Onoue et al. | |
| 8,596,287 B1 | 12/2013 | Chen et al. | |
| 8,597,723 B1 | 12/2013 | Jung et al. | |
| 8,603,649 B2 | 12/2013 | Onoue | |
| 8,603,650 B2 | 12/2013 | Sonobe et al. | |
| 8,605,388 B2 | 12/2013 | Yasumori et al. | |
| 8,605,555 B1 * | 12/2013 | Chernyshov et al. | 369/13.33 |
| 8,608,147 B1 | 12/2013 | Yap et al. | |
| 8,609,263 B1 | 12/2013 | Chernyshov et al. | |
| 8,619,381 B2 | 12/2013 | Moser et al. | |
| 8,623,528 B2 | 1/2014 | Umezawa et al. | |
| 8,623,529 B2 | 1/2014 | Suzuki | |
| 8,634,155 B2 | 1/2014 | Yasumori et al. | |
| 8,658,003 B1 | 2/2014 | Bourez | |
| 8,658,292 B1 | 2/2014 | Mallary et al. | |
| 8,665,541 B2 | 3/2014 | Saito | |
| 8,668,953 B1 | 3/2014 | Buechel-Rimmel | |
| 8,674,327 B1 | 3/2014 | Poon et al. | |
| 8,685,214 B1 | 4/2014 | Moh et al. | |
| 2002/0060883 A1 | 5/2002 | Suzuki | |
| 2003/0022024 A1 | 1/2003 | Wachenschwanz | |
| 2003/0096077 A1 | 5/2003 | Ju et al. | |
| 2004/0022387 A1 | 2/2004 | Weikle | |
| 2004/0132301 A1 | 7/2004 | Harper et al. | |
| 2004/0202793 A1 | 10/2004 | Harper et al. | |
| 2004/0202865 A1 | 10/2004 | Homola et al. | |
| 2004/0209123 A1 | 10/2004 | Bajorek et al. | |
| 2004/0209470 A1 | 10/2004 | Bajorek | |
| 2005/0036223 A1 | 2/2005 | Wachenschwanz et al. | |
| 2005/0142990 A1 | 6/2005 | Homola | |
| 2005/0150862 A1 | 7/2005 | Harper et al. | |
| 2005/0151282 A1 | 7/2005 | Harper et al. | |
| 2005/0151283 A1 | 7/2005 | Bajorek et al. | |
| 2005/0151300 A1 | 7/2005 | Harper et al. | |
| 2005/0155554 A1 | 7/2005 | Saito | |
| 2005/0167867 A1 | 8/2005 | Bajorek et al. | |
| 2005/0202287 A1 | 9/2005 | Lu et al. | |
| 2005/0263401 A1 | 12/2005 | Olsen et al. | |
| 2006/0147758 A1 | 7/2006 | Jung et al. | |
| 2006/0181697 A1 | 8/2006 | Treves et al. | |
| 2006/0207890 A1 | 9/2006 | Staud | |
| 2007/0026263 A1 * | 2/2007 | Kubota et al. | 428/832 |
| 2007/0070549 A1 | 3/2007 | Suzuki et al. | |
| 2007/0245909 A1 | 10/2007 | Homola | |
| 2008/0075845 A1 | 3/2008 | Sonobe et al. | |
| 2008/0093760 A1 | 4/2008 | Harper et al. | |
| 2009/0116804 A1 * | 5/2009 | Peng et al. | 385/131 |
| 2009/0117408 A1 | 5/2009 | Umezawa et al. | |
| 2009/0136784 A1 | 5/2009 | Suzuki et al. | |
| 2009/0169922 A1 | 7/2009 | Ishiyama | |
| 2009/0191331 A1 | 7/2009 | Umezawa et al. | |
| 2009/0202866 A1 | 8/2009 | Kim et al. | |
| 2009/0311557 A1 | 12/2009 | Onoue et al. | |
| 2010/0123967 A1 * | 5/2010 | Batra et al. | 360/59 |
| 2010/0143752 A1 | 6/2010 | Ishibashi et al. | |
| 2010/0190035 A1 | 7/2010 | Sonobe et al. | |
| 2010/0196619 A1 | 8/2010 | Ishiyama | |
| 2010/0196740 A1 | 8/2010 | Ayama et al. | |
| 2010/0209601 A1 | 8/2010 | Shimokawa et al. | |
| 2010/0215992 A1 | 8/2010 | Horikawa et al. | |
| 2010/0232065 A1 | 9/2010 | Suzuki et al. | |
| 2010/0247965 A1 | 9/2010 | Onoue | |
| 2010/0261039 A1 | 10/2010 | Itoh et al. | |
| 2010/0279151 A1 | 11/2010 | Sakamoto et al. | |
| 2010/0300884 A1 | 12/2010 | Homola et al. | |
| 2010/0304186 A1 | 12/2010 | Shimokawa | |
| 2011/0096432 A1 | 4/2011 | Lu et al. | |
| 2011/0097603 A1 | 4/2011 | Onoue | |
| 2011/0097604 A1 | 4/2011 | Onoue | |
| 2011/0171495 A1 | 7/2011 | Tachibana et al. | |
| 2011/0206947 A1 | 8/2011 | Tachibana et al. | |
| 2011/0212346 A1 | 9/2011 | Onoue et al. | |
| 2011/0223446 A1 | 9/2011 | Onoue et al. | |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0140359 A1 | 6/2012 | Tachibana | |
| 2012/0141833 A1 | 6/2012 | Umezawa et al. | |
| 2012/0141835 A1 | 6/2012 | Sakamoto | |
| 2012/0148875 A1 | 6/2012 | Hamakubo et al. | |
| 2012/0156523 A1 | 6/2012 | Seki et al. | |
| 2012/0164488 A1 | 6/2012 | Shin et al. | |
| 2012/0170152 A1 | 7/2012 | Sonobe et al. | |
| 2012/0171369 A1 | 7/2012 | Koike et al. | |
| 2012/0175243 A1 | 7/2012 | Fukuura et al. | |
| 2012/0189872 A1 | 7/2012 | Umezawa et al. | |
| 2012/0196049 A1 | 8/2012 | Azuma et al. | |
| 2012/0207919 A1 | 8/2012 | Sakamoto et al. | |
| 2012/0225217 A1 | 9/2012 | Itoh et al. | |
| 2012/0251842 A1 | 10/2012 | Yuan et al. | |
| 2012/0251846 A1 | 10/2012 | Desai et al. | |
| 2012/0276417 A1 | 11/2012 | Shimokawa et al. | |
| 2012/0308722 A1 | 12/2012 | Suzuki et al. | |
| 2013/0016591 A1 * | 1/2013 | Tomikawa et al. | 369/13.02 |
| 2013/0040167 A1 | 2/2013 | Alagarsamy et al. | |
| 2013/0071694 A1 | 3/2013 | Srinivasan et al. | |
| 2013/0165029 A1 | 6/2013 | Sun et al. | |
| 2013/0175252 A1 | 7/2013 | Bourez | |
| 2013/0216865 A1 | 8/2013 | Yasumori et al. | |
| 2013/0230647 A1 | 9/2013 | Onoue et al. | |

(56) References Cited

U.S. PATENT DOCUMENTS

| | | |
|---|---|---|
| 2013/0288079 A1* | 10/2013 | Chang et al. .............. 428/828 |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yl et al. |

OTHER PUBLICATIONS

U.S. Appl. No. 14/037,235, filed Sep. 25, 2013, 21 pages.
U.S. Appl. No. 13/451,380, filed Apr. 19, 2012, 17 pages.
U.S. Appl. No. 13/769,232, filed Feb., 15, 2013, 19 pages.
Andrew J. Bullen et al., "Thermal Conductivity of Amorphous Carbon Thin Films," Journal of Applied Physics, vol. 88, No. 11, Dec. 1, 2000, pp. 6316-6320.

* cited by examiner

SYSTEMS AND METHODS FOR PROVIDING THERMAL BARRIER BILAYERS FOR HEAT ASSISTED MAGNETIC RECORDING MEDIA

CROSS-REFERENCE TO RELATED APPLICATION(S)

This application claims priority to and the benefit of U.S. Provisional Application No. 61/820,583, filed on May 7, 2013, entitled, "SYSTEMS AND METHODS FOR PROVIDING TRANSPARENT THERMAL BARRIER LAYERS FOR HEAT ASSISTED MAGNETIC RECORDING MEDIA", the entire content of which is incorporated herein by reference.

FIELD

The present invention relates generally to magnetic media disks for magnetic recording, and more specifically to systems and methods for providing thermal barrier bilayers for heat assisted magnetic recording (HAMR) media.

BACKGROUND

Energy/Heat Assisted Magnetic Recording (EAMR/HAMR) systems can potentially increase the areal density of information recorded magnetically on various media. For example, to achieve magnetic information storage levels beyond 1 terabit per inch squared, smaller grain size (e.g., less than 6 nm) media may be required. Such designs can demand higher Ku materials for a recording layer to sustain thermal stability, such as L10 ordered FePt alloys. Due to high anisotropy, FePt media is not writable with conventional recording heads. Therefore, either exchange coupled composite media structure or heat-assisted magnetic recording (HAMR) are generally needed. HAMR media generally includes a magnetic recording layer and a heat sink positioned beneath the magnetic recording layer. To facilitate efficient HAMR, including the use of minimal laser power to achieve heat assisted writing and reading of information on the media, it is necessary to dissipate heat and/or light energy from the magnetic recording layer. Typically, this is achieved to a certain degree by the heat sink layer. However, conventional heat sink layers may not adequately dissipate heat and/or light energy from the magnetic recording layer.

To address this problem and a more specific problem of lateral heat spreading from the heat sink, U.S. Pat. No. 7,869,162 describes HAMR media including a thermal resistor layer added between the heat sink and recording layer. However, the HAMR media with this thermal resistor layer has limited efficiency and may not adequately dissipate heat and/or light energy from the magnetic recording layer in many applications. Accordingly, an improved HAMR media structure that addresses these shortcomings is needed.

DETAILED DESCRIPTION

Some comparative thermal designs for heat assisted magnetic recording (HAMR) media include a recording layer made of FePt, a thermal barrier layer and a heat sink. For example, one such comparative media design utilizes Ru or Mo as a heat sink, and an amorphous under-layer (AUL) as a thermal barrier layer. In order to minimize surface roughness (Ra) or waviness caused by the heat sink, the AUL layer generally has to be thicker than about 25 nanometers (nm). However, the relatively thick AUL not only degrades on-track thermal gradient, but also absorbs a significant portion of incoming light from the near field transducer (NFT) of a HAMR system.

While not bound by any particular theory, optimizing thermal barrier layer and heat sink thicknesses and thermal properties can ensure the highest thermal gradient per laser power that a magnetic head could sustain. An ideal heat sink layer can have as high as possible thermal conductivity (κ) and an ideal thermal barrier layer can have as low as possible κ. The latter ensures that a barrier layer should be relatively thin and lateral heat diffusion in the thermal barrier layer is minimal. Another aspect of the thermal barrier layer is the associated optical properties. As observed experimentally, the recording layer could generally absorb only a portion of light coming from a nearby NFT, and therefore, a significant portion of incoming NFT and waveguide light could be absorbed in the thermal barrier layer depending on its properties. The latter absorption effect would degrade both on-track and off-track media recording performance, especially if side lobes from the waveguide are present. On the contrary, if barrier layer is transparent, light is coupled more directly to the heat sink and the associated energy is quickly dissipated. Accordingly, the thermal barrier bilayers described herein can address both lowering the thermal conductivity of the thermal barrier layer, and, when the first thermal barrier layer is transparent, coupling light from the NFT directly to the heat sink for rapid dissipation.

Another comparative design utilizes an AUL as a thermal barrier layer in between a growth layer of MgO and a heat sink of Mo. While not bound by any particular theory, in EAMR or HAMR systems including a thermal barrier layer between the growth layer and the heat sink layer, the heat sink and interlayer (e.g., AUL) serve mutually competitive purposes. More specifically, the steady state temperature profile is controlled by inter-layer (thermal resistance) and heat sink heat conductivity/thickness (lateral dissipation). The heat sink ensures fast cooling rate to achieve a high gradient, small thermal spot and avoid adjacent track erasure. However, the interlayer (e.g., AUL in this case) degrades the gradient, but limits laser power to reach Curie temperature (TC).

To minimize the above described disadvantages, a new HAMR media structure is proposed that includes a thermal barrier bilayer including first thermal barrier layer and an AUL on the first thermal barrier layer, where the first thermal barrier layer is composed of one or more materials having a relatively low thermal conductivity such that the thermal conductivity of the first thermal barrier layer is less than the thermal conductivity of the amorphous underlayer. The thermal barrier bilayer can efficiently dissipate both heat and light from a nearby HAMR light source (e.g., laser) and can also reduce the media surface roughness typically caused by the heat sink. Since heat and light are efficiently dissipated, the associated HAMR laser power may be controlled and reduced.

In one embodiment, the first thermal barrier layer of the thermal barrier bilayer is substantially (e.g., about) transparent. The transparent feature enables the thermal barrier bilayer to substantially conduct laser light to the heat sink and thereby allow the heat sink to efficiently dissipate the laser light from the nearby HAMR laser. In some embodiments, the first thermal barrier layer (e.g., lower layer) of the thermal barrier bilayer is made of carbon and deposited using chemical vapor deposition (CVD) or sputter deposition. In one such case, with the appropriately selected materials, the first thermal barrier layer has lower thermal conductivity (about 1 watt per meter Kelvin or W/mK) than the AUL (about 10 W/mK), is transparent, and is capable of reducing Ra or waviness caused by the heat sink.

In one embodiment of the new HAMR media with the thermal barrier bilayer, it is proposed to partially substitute a portion of the AUL with a transparent CVD carbon layer, or another suitable material. As an amorphous material, the AUL has relatively low thermal conductivity ($\kappa$ of about 10 W/mK), but the $\kappa$ of the CVD layer is significantly lower (about 1 W/mK, as measured in a pump probe test). In some embodiments, the carbon first thermal barrier layer can be deposited using sputtering instead of CVD. In general, the deposition can be performed using a bias voltage applied to the media substrate to improve deposition. In one embodiment, the heat sink layer a can have an experimental thermal conductivity value of about 50 to 100 W/mK, and possibly nominal values of 70 and 100 W/mK.

The AUL can also be deposited with a high bias voltage (e.g., 300V) which can effectively reduce the roughness (Ra) caused by the heat sink. In some of the comparative designs, a 25 nm thick AUL is generally capable to reduce the surface roughness to an acceptable level. However, a thinner AUL (less than 25 nm) shows degradation in performance due to waviness.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

Figure 1:
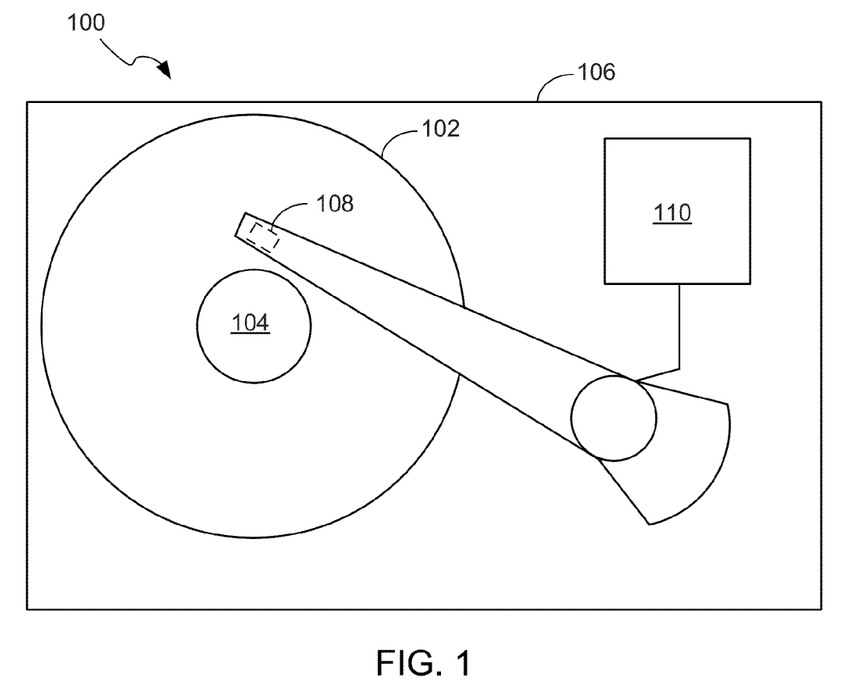
FIG. 1 is a top schematic view of a disk drive configured for heat assisted magnetic recording (HAMR) and including a magnetic medium with a thermal barrier bilayer in accordance with one embodiment of the invention.

FIG. 1 is a top schematic view of a disk drive 100 configured for heat assisted magnetic recording (HAMR) and including a magnetic medium 102 with a thermal barrier bilayer in accordance with one embodiment of the invention. The laser (not visible in FIG. 1 but see FIG. 2) is positioned with a head/slider 108. Disk drive 100 may include one or more disks/media 102 to store data. Disk/media 102 resides on a spindle assembly 104 that is mounted to drive housing 106. Data may be stored along tracks in the magnetic recording layer of disk 102. The reading and writing of data is accomplished with the head 108 that may have both read and write elements. The write element is used to alter the properties of the magnetic recording layer of disk 102 and thereby write information thereto. In one embodiment, head 104 may have magneto-resistive (MR), or giant magneto-resistive (GMR) elements. In an alternative embodiment, head 104 may be another type of head, for example, an inductive read/write head or a Hall effect head.

In operation, a spindle motor (not shown) rotates the spindle assembly 104, and thereby rotates disk 102 to position head 108 at a particular location along a desired disk track. The position of head 104 relative to disk 102 may be controlled by position control circuitry 110.

Figure 2:
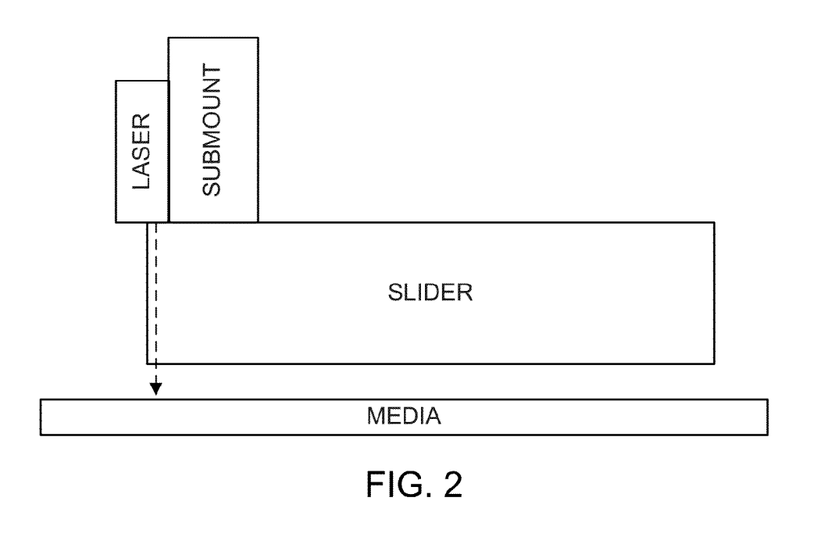
FIG. 2 is a side cross sectional schematic view of selected components of the HAMR system of FIG. 1 including the magnetic medium with the thermal barrier bilayer in accordance with one embodiment of the invention.

FIG. 2 is a side cross sectional schematic view of selected components of the HAMR system of FIG. 1 including the magnetic medium 102 with the thermal barrier bilayer (not visible in FIG. 2 but see FIG. 3) in accordance with one embodiment of the invention. The HAMR system components also include a sub-mount attached to a top surface of the slider. The laser is attached to the sub-mount, and possibly to the slider. The slider includes the write element and the read element positioned along an air bearing surface (ABS) of the slider for writing information to, and reading information from, respectively, the media 102.

In operation, the laser is configured to direct light energy to a waveguide in the slider which directs the light to a NFT near the air bearing surface (e.g., bottom surface) of the slider. Upon receiving the light from the laser via the waveguide, the NFT generates localized heat energy that heats a portion of the media 102 near the write element and the read element. FIGS. 1 and 2 illustrate a specific embodiment of a HAMR system. In other embodiments, the new media with the thermal barrier bilayer can be used in other suitable HAMR systems.

Figure 3:
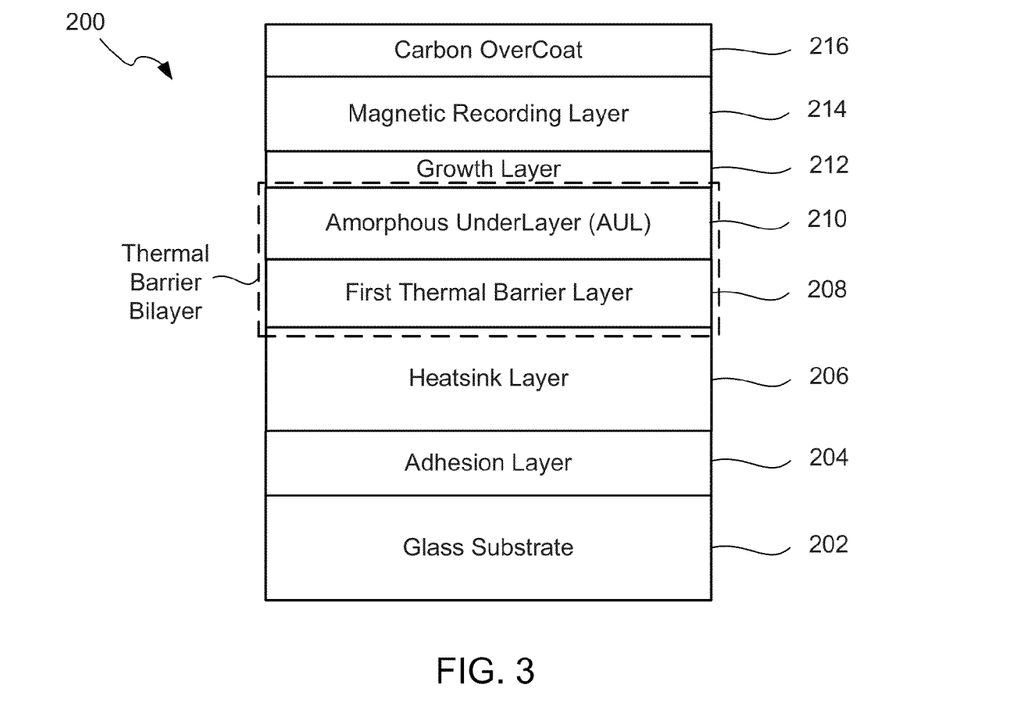
FIG. 3 is side cross sectional view of a HAMR medium having a thermal barrier bilayer that includes a first thermal barrier layer under an amorphous underlayer (AUL) in accordance with one embodiment of the invention.

FIG. 3 is side cross sectional view of a HAMR medium 200 having a thermal barrier bilayer that includes a first thermal barrier layer (208) under an amorphous underlayer (AUL, 210) in accordance with one embodiment of the invention. The medium 200 has a stacked structure with a glass substrate 202 at a bottom/base layer, an adhesion layer 204 on the glass substrate 202, a heat sink layer 206 on the adhesion layer 204, the first thermal barrier layer 208 on the heat sink layer 206, the AUL 210 on the first thermal barrier layer 208, a growth layer 212 on the AUL 210, a magnetic recording layer 214 on the growth layer 212, and a carbon overcoat layer 216 on the magnetic recording layer 214. The first thermal barrier layer 208 and the AUL 210 make up the thermal barrier bilayer. In some embodiments, the adhesion layer 204, growth layer 212, and carbon overcoat 216 can be omitted from the medium structure.

In several embodiments, the thermal conductivity of the first thermal barrier layer 208 is less than the thermal conductivity of the AUL 210. As a result, the overall thermal conductivity of the thermal barrier bilayer is substantially reduced as compared to a medium having only the AUL. In some embodiments, the thermal conductivity of the first thermal barrier layer is in a range of about 5 percent to about 25 percent of the thermal conductivity of the AUL. In one such embodiment, the thermal conductivity of the first thermal barrier layer is about 10 percent of the thermal conductivity of the AUL.

In several embodiments, the first thermal barrier layer 208 is made of one or materials that are substantially (e.g., about) transparent. For example, in one embodiment, the first thermal barrier layer is at least 50 percent transparent at a common wavelength of light applied to the media (e.g., at a wavelength of about 800 nm). In some embodiments, the first thermal barrier layer is made of at least one material that is different from one material of the amorphous underlayer. In several embodiments, the first thermal barrier layer includes an amorphous material, such as amorphous carbon or another suitable amorphous material.

In several embodiments, the thermal barrier bilayer is configured to (e.g., the materials for the first thermal barrier layer are selected to) facilitate a heat transfer from the magnetic recording layer to the heat sink layer, and impede a heat transfer from the heat sink layer to the magnetic recording layer. In a number of embodiments, the first thermal barrier layer is deposited using a deposition sub-process involving application of a bias voltage (e.g., about 300 volts or another suitable voltage) to the substrate. For example, in one such embodiment, the deposition sub-process is a chemical vapor deposition (CVD) sub-process or a sputter deposition sub-process. In one such embodiment, the first thermal barrier layer includes CVD deposited amorphous carbon.

In several embodiments, the AUL can include one or more materials such as CrTiX, CrTaX, NiTaX, CoCrTaZrX, CoFeZrBCrX, CoTaZrX, CoFeTaZrX, CoCrWTaZrX, CoCrMoTaZrX, CoZrWMoX, combinations thereof, and/or other suitable materials known in the art, where X can be SiO2 and/or ZrO2.

In one embodiment, the substrate can be made of one or more materials such as an Al alloy, NiP plated Al, glass, glass ceramic, and/or combinations thereof. In one embodiment, the adhesion layer can includes one or more materials such as CrTi, CrTa, NiTa, CoCrTaZr, CoFeZrBCr, CoTaZr, CoFeTaZr, CoCrWTaZr, CoCrMoTaZr, CoZrWMo, combinations thereof, and/or other suitable materials known in the art.

In one embodiment, the heat sink layer can be made of one or more materials such as Ag, Al, Au, Cu, Cr, Mo, Ru, W, CuZr, MoCu, AgPd, CrRu, CrV, CrW, CrMo, CrNd, NiAl, NiTa, combinations thereof, and/or other suitable materials known in the art.

In one embodiment, the first thermal barrier layer can be made of one or more materials such as C, Al2O3, SiO2, WO3, Ta2O5, Nb2O5, ZrO2, SiN, NiP, TiN, combinations thereof, and/or other suitable materials known in the art.

In one embodiment, the growth layer can be made of one or more materials such as Cr, Mo, NiAl, MgO, TiC, TiN, Ag, CrMo, Pt, Pd, Ru, combinations thereof, and/or other suitable materials known in the art.

In one embodiment, the magnetic recording layer can be made of one or more materials such as FePt, CoPt, combinations thereof, and/or other suitable materials known in the art.

Figure 4:
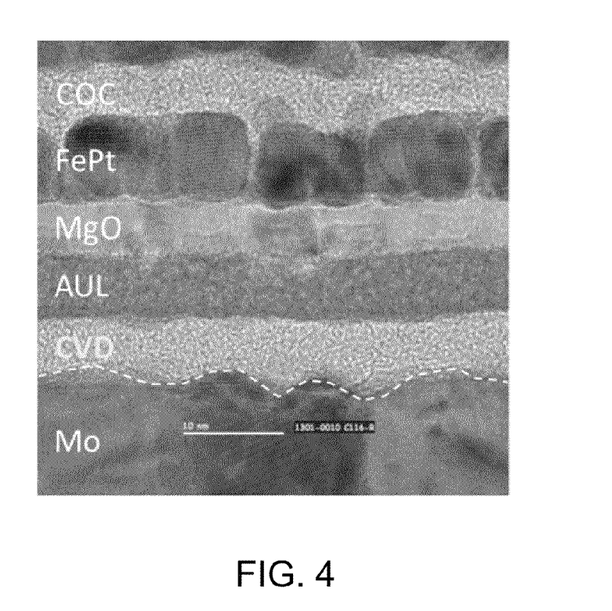
FIG. 4 is side cross sectional transmission electron microscope (TEM) view of a HAMR medium including a thermal barrier bilayer between the recording layer and the heat sink layer in accordance with one embodiment of the invention.

FIG. 4 is side cross sectional transmission electron microscope (TEM) view of a HAMR medium including a thermal barrier bilayer (CVD, AUL) between the recording layer (FePt) and the heat sink layer (Mo) in accordance with one embodiment of the invention. As illustrated, the thermal barrier bilayer which includes the first thermal barrier layer or CVD layer also effectively smoothens the Ra from the heat sink. In one aspect, it was determined that the AUL could not be completely eliminated due to adhesion problems between the growth layer of MgO and the CVD deposited first thermal barrier layer of amorphous carbon. The carbon overcoat layer is designated as COC.

Figure 5:
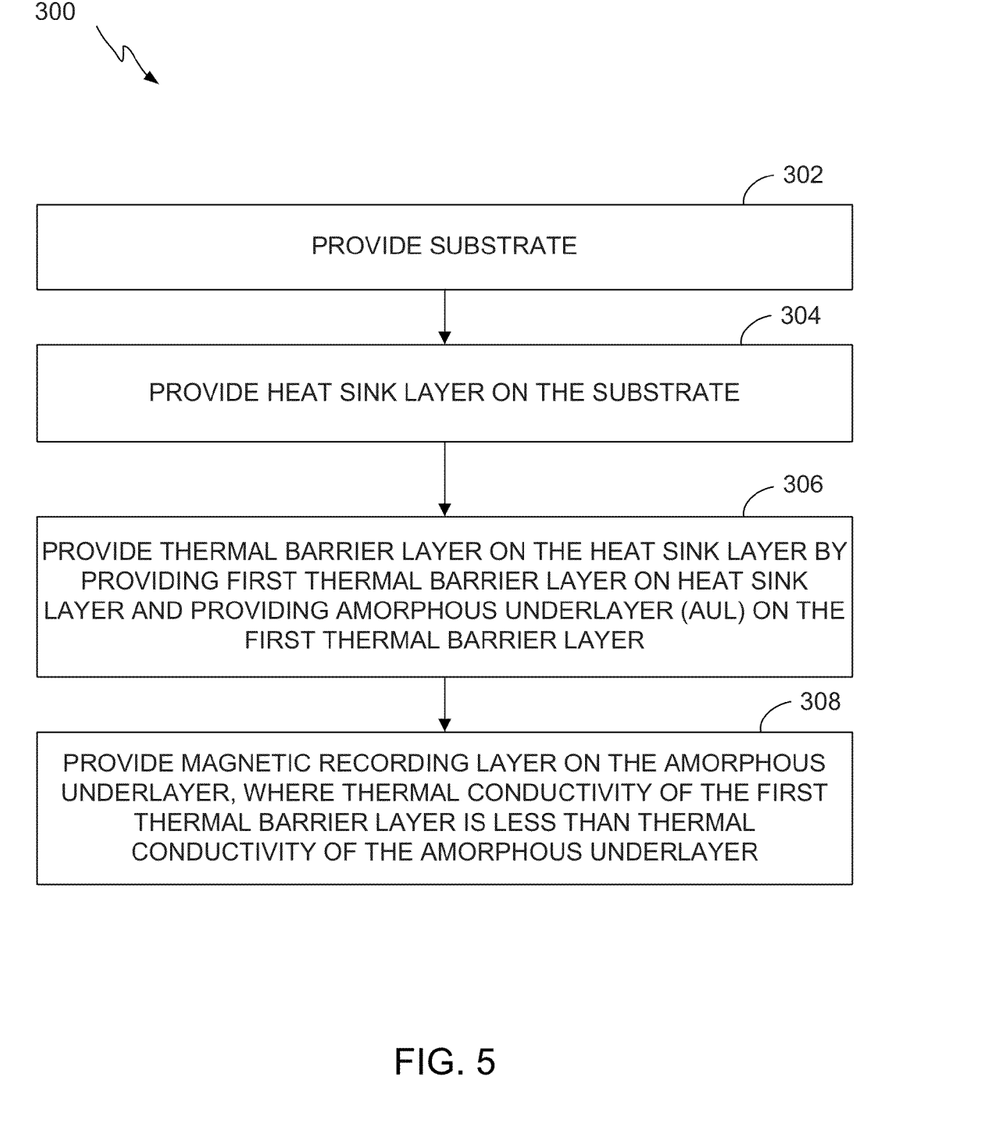
FIG. 5 is a flowchart of a process for manufacturing a HAMR medium including a thermal barrier bilayer in accordance with one embodiment of the invention.

FIG. 5 is a flowchart of a process 300 for manufacturing a HAMR medium including a thermal barrier bilayer in accordance with one embodiment of the invention. In particular embodiments, the process 300 can be used to manufacture the HAMR magnetic media of FIG. 3, FIG. 2, or FIG. 1. The process first provides a substrate in block 302. The process then provides a heat sink layer on the substrate in block 304. The process then provides a thermal barrier bilayer on the heat sink layer by providing a first thermal barrier layer on the heat sink layer, and providing an amorphous underlayer on the first thermal barrier layer in block 306. The process then provides a magnetic recording layer on the amorphous underlayer, where a thermal conductivity of the first thermal barrier layer is less than a thermal conductivity of the amorphous underlayer in block 308.

In a number of embodiments, the process can manufacture the layers of the HAMR medium with any of the numerous variations described above for the embodiments of FIGS. 1, 2, and 3. For example, in one such case, the process can also provide an adhesion layer between the substrate and the heat sink layer, a growth layer between the amorphous underlayer and the magnetic recording layer, and an overcoat layer on the magnetic recording layer. In several embodiments, the layers can include the materials as are described above.

In some embodiments, the process provides the first thermal barrier layer on the heat sink layer by applying a bias voltage to the substrate, and depositing the first thermal barrier layer on the heat sink layer using a deposition sub-process. In one such case, the deposition sub-process can be a chemical vapor deposition sub-process and/or a sputter deposition sub-process.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 6A:
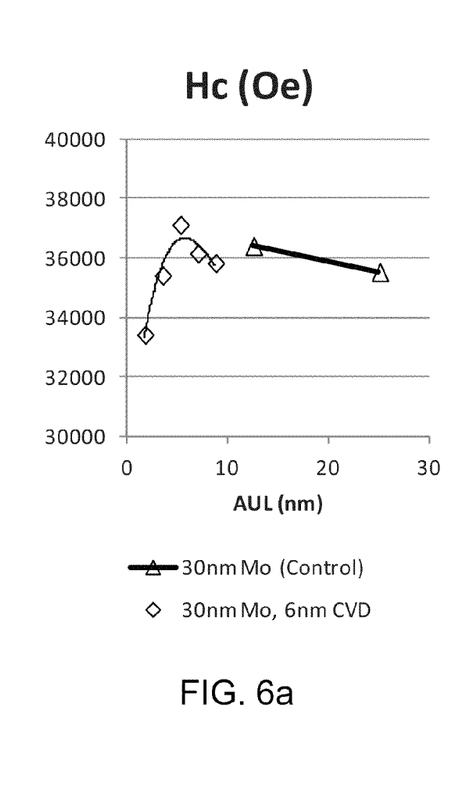
FIGS. 6a, 6b, and 6c illustrate coercive field (Hc), full width half maximum (FWHM), and surface roughness (Ra) measurements, respectively, versus AUL thickness for a comparative HAMR medium without a thermal barrier bilayer (Control) compared against a HAMR medium with a thermal barrier bilayer in accordance with one embodiment of the invention.
Figure 6B:
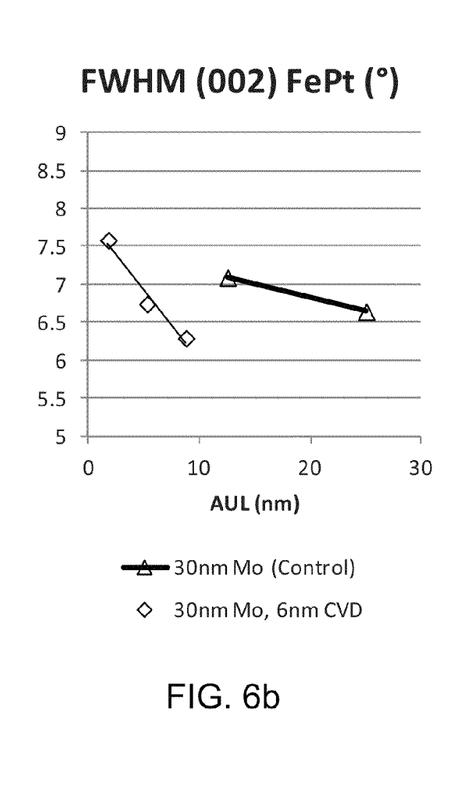
Figure 6C:
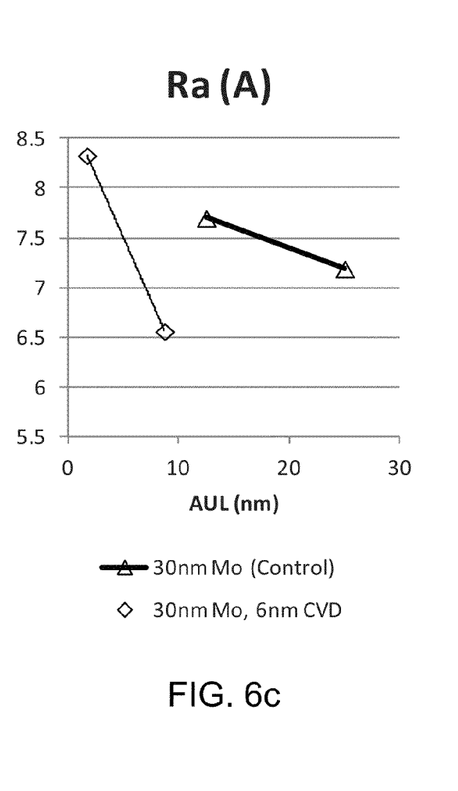

FIGS. 6a, 6b, and 6c illustrate coercive field (Hc), full width half maximum (FWHM), and surface roughness (Ra) measurements, respectively, versus AUL thickness for a comparative HAMR medium without a thermal barrier bilayer (Control) compared against a HAMR medium with a thermal barrier bilayer in accordance with one embodiment of the invention. The comparative HAMR medium without a thermal barrier bilayer (Control) can have a relatively thick AUL as compared to the new HAMR medium with the thermal barrier bilayer (e.g., 6 nm CVD amorphous carbon for first thermal barrier layer and 8 nm AUL of CoZiWMo). One can see that the performance measurements for the new HAMR medium with the thermal barrier bilayer with the combined 6 nm CVD and roughly 8 nm AUL thickness show roughly matching Hc, and substantially lower FWHM and Ra as compared to the control HAMR medium without the thermal barrier bilayer. The coercive field (Hc) is measured in Oersteds, the full width half maximum (FWHM) is measured in degrees, and the surface roughness (Ra) is measured in Angstroms.

Figure 7A:
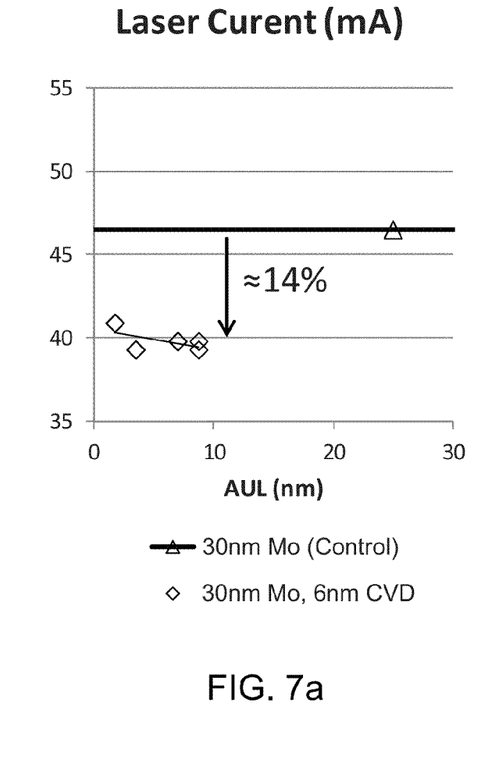
FIGS. 7a, 7b, and 7c illustrate laser current, weighted sum signal to noise ratio (wsSNR), and jitter measurements, respectively, versus AUL thickness for a comparative HAMR medium without a thermal barrier bilayer (Control) compared against a HAMR medium with a thermal barrier bilayer in accordance with one embodiment of the invention.
Figure 7B:
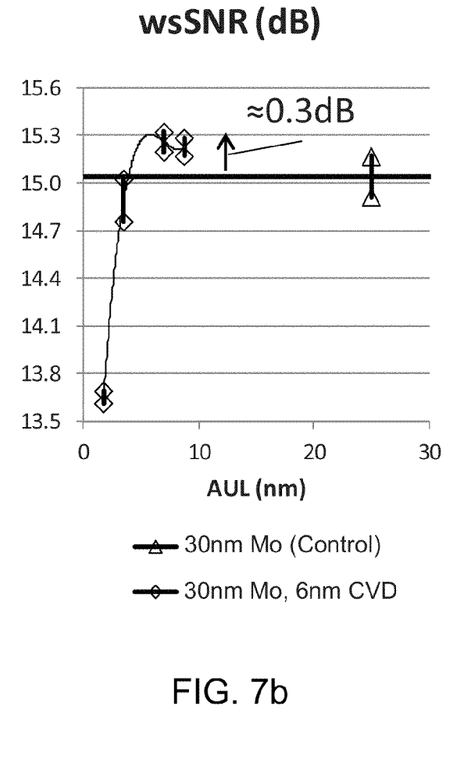
Figure 7C:
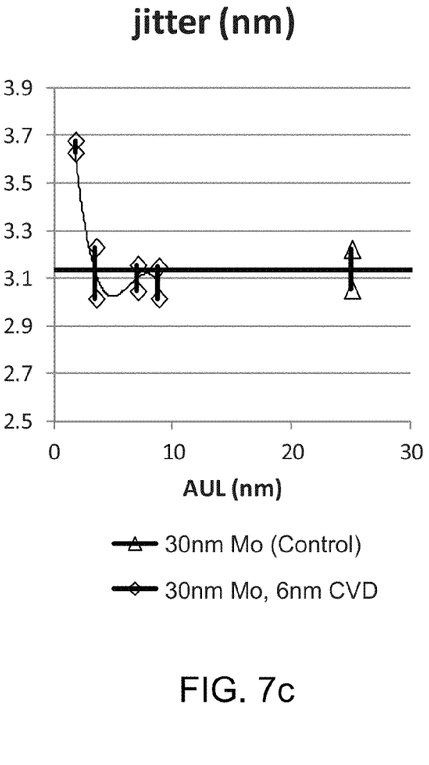

FIGS. 7a, 7b, and 7c illustrate laser current, weighted sum signal to noise ratio (wsSNR), and jitter measurements, respectively, versus AUL thickness for a comparative HAMR medium without a thermal barrier bilayer (Control) compared against a HAMR medium with a thermal barrier bilayer in accordance with one embodiment of the invention. The comparative HAMR medium without a thermal barrier bilayer (Control) can have a relatively thick AUL as compared to the new HAMR medium with the thermal barrier bilayer (e.g., 6 nm CVD amorphous carbon for first thermal barrier layer and 8 nm AUL of CoZiWMo). One can see that at combined 6 nm CVD and roughly 8 nm AUL thickness, the performance measurements for the new HAMR medium with the thermal barrier bilayer shows about 14% laser current/power reduction, about 0.3 dB wsSNR improvement, and about matching jitter as compared to the control HAMR medium without the thermal barrier bilayer. The laser current is measured in milliamps or mA, the weighted sum signal to noise (wsSNR) is measured in decibels or dB, and the jitter is measured in nm.

In several embodiments, the HAMR media with the thermal barrier bilayer can significantly enhance technology capability towards implementation of various HAMR designs. For example, in some embodiments, the HAMR media with the thermal barrier bilayer has low thermal conductivity (about 1 W/mK) and effectively smoothens Ra/waviness from heat sink. In addition, laser power can be reduced by about 14% and the improved design does not increase costs for media fabrication processes. In some embodiments, and while not bound by any particular theory, it can be non-intuitive to add a layer such as the first thermal barrier layer between the AUL and the heat sink layer using a deposition process such as CVD or sputtering while applying a bias voltage since these radio frequency (RF) processes may generate a number of particles which can interfere with the formation of the AUL and consequently the growth layer, which is often formed of MgO. If the AUL and growth layer are improperly formed, the recording layer and media as a whole may exhibit performance problems.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

For example, in several embodiments, the deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A medium for heat assisted magnetic recording, the medium comprising:
    a substrate;
    a heat sink layer on the substrate;
    a thermal barrier bilayer on the heat sink layer, the thermal barrier bilayer comprising:
        a first thermal barrier layer on the heat sink layer, and
        an amorphous underlayer on the first thermal barrier layer; and
    a magnetic recording layer on the amorphous underlayer,
    wherein a thermal conductivity of the first thermal barrier layer is less than a thermal conductivity of the amorphous underlayer.

2. The medium of claim 1, wherein the thermal conductivity of the first thermal barrier layer is in a range of about 5 percent to about 25 percent of the thermal conductivity of the amorphous underlayer.

3. The medium of claim 1, wherein the thermal conductivity of the first thermal barrier layer is about 10 percent of the thermal conductivity of the amorphous underlayer.

4. The medium of claim 1, wherein the first thermal barrier layer is about transparent and comprises at least one material different from a material of the amorphous underlayer.

5. The medium of claim 1, wherein the first thermal barrier layer comprises an amorphous material.

6. The medium of claim 5, wherein the first thermal barrier layer comprises amorphous carbon.

7. The medium of claim 1, wherein the thermal barrier bilayer is configured to:
    facilitate a heat transfer from the magnetic recording layer to the heat sink layer; and
    impede a heat transfer from the heat sink layer to the magnetic recording layer.

8. The medium of claim 1, wherein the first thermal barrier layer is deposited using a deposition sub-process comprising application of a bias voltage to the substrate.

9. The medium of claim 8, wherein the deposition sub-process is selected from the group consisting of a chemical vapor deposition sub-process and a sputter deposition sub-process.

10. The medium of claim 1, wherein the amorphous underlayer comprises a material selected from the group consisting of CrTiX, CrTaX, NiTaX, CoCrTaZrX, CoFeZrBCrX, CoTaZrX, CoFeTaZrX, CoCrWTaZrX, CoCrMoTaZrX, CoZrWMoX, and combinations thereof, wherein X is selected from the group consisting of $SiO_2$ and $ZrO_2$.

11. The medium of claim 1, further comprising:
    an adhesion layer between the substrate and the heat sink layer;
    a growth layer between the amorphous underlayer and the magnetic recording layer; and
    an overcoat layer on the magnetic recording layer.

12. The medium of claim 11:
    wherein the substrate comprises a material selected from the group consisting of an Al alloy, NiP plated Al, glass, glass ceramic, and combinations thereof;
    wherein the adhesion layer comprises a material selected from the group consisting of CrTi, CrTa, NiTa, CoCr- TaZr, CoFeZrBCr, CoTaZr, CoFeTaZr, CoCrWTaZr, CoCrMoTaZr, CoZrWMo, and combinations thereof;

wherein the heat sink layer comprises a material selected from the group consisting of Ag, Al, Au, Cu, Cr, Mo, Ru, W, CuZr, MoCu, AgPd, CrRu, CrV, CrW, CrMo, CrNd, NiAl, NiTa, and combinations thereof;

wherein the first thermal barrier layer comprises a material selected from the group consisting of C, Al2O3, SiO2, WO3, Ta2O5, Nb2O5, ZrO2, SiN, and combinations thereof;

wherein the amorphous underlayer comprises a material selected from the group consisting of CrTiX, CrTaX, NiTaX, CoCrTaZrX, CoFeZrBCrX, CoTaZrX, CoFeTaZrX, CoCrWTaZrX, CoCrMoTaZrX, CoZrWMoX, and combinations thereof, wherein X is selected from the group consisting of SiO2 and ZrO2;

wherein the growth layer comprises a material selected from the group consisting of Cr, Mo, NiAl, MgO, TiC, TiN, Ag, CrMo, Pt, Pd, Ru, and combinations thereof;

wherein the magnetic recording layer comprises a material selected from the group consisting of FePt, CoPt, and combinations thereof; and wherein the overcoat layer comprises C.

13. A heat assisted magnetic recording system comprising: the medium of claim 1;
a light source configured to direct light energy on to the medium; and
a magnetic transducer configured to write information to the medium.

14. A method for fabricating a medium for heat assisted magnetic recording, the method comprising:
providing a substrate;
providing a heat sink layer on the substrate;
providing a thermal barrier bilayer on the heat sink layer comprising:
providing a first thermal barrier layer on the heat sink layer, and
providing an amorphous underlayer on the first thermal barrier layer; and
providing a magnetic recording layer on the amorphous underlayer,
wherein a thermal conductivity of the first thermal barrier layer is less than a thermal conductivity of the amorphous underlayer.

15. The method of claim 14, wherein the thermal conductivity of the first thermal barrier layer is in a range of about 5 percent to about 25 percent of the thermal conductivity of the amorphous underlayer.

16. The method of claim 14, wherein the thermal conductivity of the first thermal barrier layer is about 10 percent of the thermal conductivity of the amorphous underlayer.

17. The method of claim 14, wherein the first thermal barrier layer is about transparent and comprises at least one material different from a material of the amorphous underlayer.

18. The method of claim 14, wherein the first thermal barrier layer comprises an amorphous material.

19. The method of claim 18, wherein the first thermal barrier layer comprises amorphous carbon.

20. The method of claim 14, wherein the thermal barrier bilayer is configured to:
facilitate a heat transfer from the magnetic recording layer to the heat sink layer; and
impede a heat transfer from the heat sink layer to the magnetic recording layer.

21. The method of claim 14, wherein providing the first thermal barrier layer on the heat sink layer comprises:
applying a bias voltage to the substrate; and
depositing the first thermal barrier layer on the heat sink layer using a deposition sub-process.

22. The method of claim 21, wherein the deposition sub-process is selected from the group consisting of a chemical vapor deposition sub-process and a sputter deposition sub-process.

23. The method of claim 14, wherein the amorphous underlayer comprises a material selected from the group consisting of CrTiX, CrTaX, NiTaX, CoCrTaZrX, CoFeZrBCrX, CoTaZrX, CoFeTaZrX, CoCrWTaZrX, CoCrMoTaZrX, CoZrWMoX, and combinations thereof, wherein X is selected from the group consisting of SiO2 and ZrO2.

24. The method of claim 14, further comprising:
providing an adhesion layer between the substrate and the heat sink layer;
providing a growth layer between the amorphous underlayer and the magnetic recording layer; and
providing an overcoat layer on the magnetic recording layer.

25. The method of claim 24:
wherein the substrate comprises a material selected from the group consisting of an Al alloy, NiP plated Al, glass, glass ceramic, and combinations thereof;
wherein the adhesion layer comprises a material selected from the group consisting of CrTi, CrTa, NiTa, CoCrTaZr, CoFeZrBCr, CoTaZr, CoFeTaZr, CoCrWTaZr, CoCrMoTaZr, CoZrWMo, and combinations thereof;
wherein the heat sink layer comprises a material selected from the group consisting of Ag, Al, Au, Cu, Cr, Mo, Ru, W, CuZr, MoCu, AgPd, CrRu, CrV, CrW, CrMo, CrNd, NiAl, NiTa, and combinations thereof;
wherein the first thermal barrier layer comprises a material selected from the group consisting of C, Al2O3, SiO2, WO3, Ta2O5, Nb2O5, ZrO2, SiN, and combinations thereof;
wherein the amorphous underlayer comprises a material selected from the group consisting of CrTiX, CrTaX, NiTaX, CoCrTaZrX, CoFeZrBCrX, CoTaZrX, CoFeTaZrX, CoCrWTaZrX, CoCrMoTaZrX, CoZrWMoX, and combinations thereof, wherein X is selected from the group consisting of SiO2 and ZrO2;
wherein the growth layer comprises a material selected from the group consisting of Cr, Mo, NiAl, MgO, TiC, TiN, Ag, CrMo, Pt, Pd, Ru, and combinations thereof;
wherein the magnetic recording layer comprises a material selected from the group consisting of FePt, CoPt, and combinations thereof; and
wherein the overcoat layer comprises C.

* * * * *